June 27, 1950  R. W. DE LANCEY  2,513,236
VALVE
Filed May 30, 1945
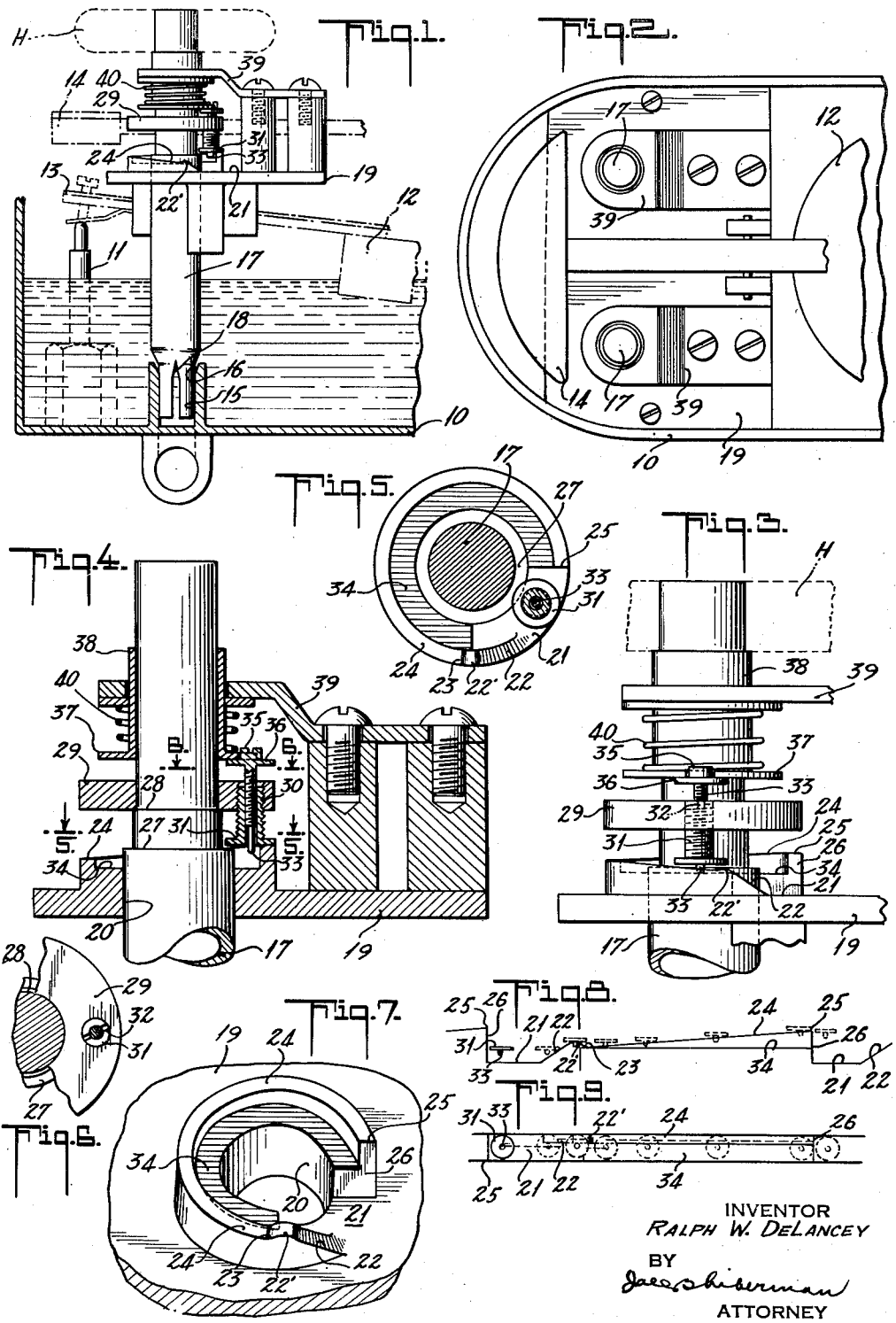
INVENTOR
RALPH W. DeLANCEY
BY
*Jacob Schiberman*
ATTORNEY Patented June 27, 1950

2,513,236

UNITED STATES PATENT OFFICE 2,513,236

VALVE

Ralph W. De Lancey, Meriden, Conn., assignor to The Miller Company, Meriden, Conn., a corporation of Connecticut Application May 30, 1945, Serial No. 596,621

13 Claims. (Cl. 137—21)

The present invention relates to valves, and is more particularly directed toward manual metering valves for controlling the flow of liquid fuel to a burner.

In the operation of gravity fed liquid fuel burners it is common to keep the burner in continuous operation by means of a pilot light which consumes a small but measured quantity of fuel and to vary the heat obtained from the burner by varying the amount of fuel fed to the burner. For reasons of safety careful restrictions have been worked out for the maximum flow which can reach the burner, and this flow must at no time be exceeded. These regulating valves are used with constant level valves which maintain a constant head of fuel on the metering valve.

The present invention contemplates a metering valve for these purposes wherein it is possible to obtain an adjustment of the amount of fuel supplied for the pilot fire and to obtain an adjustment of the maximum amount of fuel to be supplied for high fire, these two adjustments being susceptible of separate individual control so that one can flow rate the valve for both pilot and high fire operation.

According to the present invention the valve mechanism employs a reciprocatory valve member spring pressed toward closed position and cooperative devices are carried by the valve stem and the valve casing so that when relative movement is attained between them the valve stem may be moved away from the seat in measured amounts depending upon the interengagement of the devices, and controlled pilot flow, high fire flow and intermediate flow rates may be obtained.

According to the present invention there are two members disposed on a common axis parallel with the axis of the valve stem member and each is capable of individual adjustment toward or away from the surface with which it is to engage. In the preferred embodiment of the invention these members are carried by the valve stem which is rotatable and the cooperative devices are carried by the fixed casing. It is, however, entirely possible to embody the invention in structures in which the relative movement is obtained by a reciprocable non-rotatable valve stem, the other devices being rotatable.

The accompanying drawings show, for purposes of illustrating the present invention, an embodiment in which the invention may take form, it being understood that the drawings are illustrative of the invention rather than limiting the same.

In these drawings:

Figure 1 is a fragmentary sectional view through a constant level valve showing the metering valve parts in elevation in the position for high fire;

Figure 2 is a top plan view of the structure of Figure 1;

Figure 3 is a side elevational view of the metering valve of Figure 1 at a large scale and with the parts in a low fire or pilot position;

Figure 4 is a vertical sectional view through the valve stem and associated cams and follows;

Figure 5 is a sectional view on the line 5—5 of Figure 4, the valve being closed;

Figure 6 is a fragmentary sectional view on the line 6—6 of Figure 4;

Figure 7 is a perspective view illustrating cam and stop surfaces; and

Figures 8 and 9 are diagrammatic elevational and plan views illustrating the cooperation of the parts.

The casing of a combined constant level and metering valve is indicated at 10. The inlet valve is indicated at 11 and parts of the constant level valve mechanism are indicated at 12, 13, 14.

The valve casing 10 has an outlet valve opening 15 provided with a valve seat 16 arranged for cooperation with a vertically reciprocable tubular valve member 17 having an outlet passage indicated at 18. The valve casing carries a bridging member 19 which supports the constant level valve mechanism as well as one or two metering valve stems 17. These valve stems pass up through holes indicated at 20.

The bridging member is provided with cam means concentric with the valve stem opening 20. This cam means includes a low inactive portion 21, a riser 22, a reversely sloped surface 23 and a generally helical surface 24 which starts from approximately the same level as the bottom of surface 23 and ascends at such a pitch that the high point 25 is a substantially higher level. The upwardly facing cam surface abruptly terminates as indicated at 26.

The valve member 17 is provided with a shoulder 27 at a carefully predetermined distance above the portion of the valve stem which cooperates with the valve seat for a purpose to be described. The valve stem is again shouldered, as indicated at 28, and carries a ring or arm 29 approximately the same diameter as the outside of the cam means. This ring 29 is tapped as indicated at 30 to receive a flanged member 31 the upper end of which is provided with screw slots 32 to facilitate adjusting member 31 up and down. The flange member is drilled and tapped as indicated to receive a screw 33. The members 31 and 33 are coaxial and the spacing of this axis from the valve stem axis is such as to be above a horizontal stop surface 34 inside the cam means. The head 35 of the screw 33 is slotted as indicated and has a flange 36 received under a flange 37 carried by a tube 38 in which the valve stem is slidable. The tube 38 passes up through a bracket 39 supported from the bridge 19 and a coiled spring 40 is interposed between the bracket 39 and the flange 37. This coiled spring 40 presses downwardly on the flange and holds the flange 37 against flange 36 and this in turn presses the valve stem downwardly toward the valve seat 16. It also keeps pressure on the screws 31 and 33 at all times and prevents them from loosening in response to vibration no matter whether the valve is opened or closed.

The valve stem 17 can be turned on its axis by a conventional handle indicated at H. When the valve stem is in the position indicated in full lines in Figures 5, 8 and 9 both flanged member 31 and screw 33 are above the surface 21 but not in contact with this surface, and the spring 40 holds the valve completely closed. The valve member can then be turned in a clockwise direction and this will bring the follower 31 against the riser causing the follower to climb the riser and push the valve stem toward open position. The hump 22' between 22 and 23 raises the valve stem enough to have the lower end of the small diameter screw 33 pass over onto the surface 34 and the adjustment of the screw will control flow of the fuel for pilot. After a short movement of the pilot adjustment screw 33 along the surface 34 the flange of the follower 31 will then reach the surface 24, and thereafter this flange will ride up along this cam surface causing the valve to open more and more until the high point is reached at 25.

In adjusting the valve stem it is turned to high fire position and the flanged member 31 adjusted to give the desired flow rate. The valve stem is then turned to bring screw 33 opposite 34 and this screw adjusted for the proper pilot rate. The flange 36 on the pilot screw hides the screw 31 and hinders tampering.

The shoulder 27 above referred to is preferably so located that the flange of the outer follower 50 is not turned down far enough to reach this shoulder when it is moved to give the maximum flow permitted. Should one tamper with the valve and attempt to obtain a greater flow than should be had, it would be impossible to adjust the follower 31 but a very slight amount beyond the maximum permissible flow and hence the shoulder 27 prevents unauthorized adjustments in substantial excess of the maximum permissible. The rate of fuel flow can then be controlled by turning the valve stem back and forth from the high position to the low pilot position. The hump 22' also offers resistance to turning the valve stem backward and gives an indication of where to stop for pilot. It, however, does not prevent turning the burner off by backward movement of the stem. If 22, 22', 23 were omitted, one could secure controlled pilot flow by first pulling the valve stem up and then turning it until 33 rested on 34.

Since it is obvious that the invention may be embodied in other forms and constructions within the scope of the claims, I wish it to be understood that the particular form shown is but one of these forms, and various modifications and changes being possible, I do not otherwise limit myself in any way with respect thereto.

What is claimed is:

1. A valve for controlling flow of fuel to a burner, comprising a liquid fuel chamber having an outlet port, a reciprocable and rotatable valve stem cooperating with the outlet port, a fixed member through which the valve stem passes, a fixed cam having a raised surface concentric with the valve stem axis of varying spacing from the valve seat, the cam facing in the direction of the stem axis and having an inner diameter substantially greater than that of the valve stem opposite it so as to form an intervening annular space, a member fixedly carried by the valve stem adjacent the cam and having a threaded hole at a less radius than that of the raised cam surface, a bushing threaded in the hole and having an annular flange at its end, the lower face of the flange being opposite the raised cam surface throughout all positions of adjustment of the bushing in the threaded hole and of the valve stem about its axis, over the cam as the valve stem is turned, and spring means pressing the flange against the cam, the bushing being adjustable to vary the maximum valve opening which is available when the flange is in engagement with the most remote point of the cam.

2. A valve as in claim 1, wherein the cam has a generally spiral portion occupying substantially less than 360° and a vertical return beyond the end of the cam, and the stem is rotatable to allow the spring to close the valve after the member has been turned past the end of the cam.

3. A valve as in claim 1, wherein the top of the bushing has an upwardly opening slot for an adjusting tool.

4. A valve as in claim 1, wherein the top of the bushing has an upwardly opening slot for an adjusting tool, and having means to cover the slot to prevent tampering.

5. A valve as in claim 1, wherein the valve stem has a shoulder against which it is possible to bring the said flange, said shoulder providing an extreme limit of adjustment of the bushing whereby the maximum valve opening is fixed.

6. In a valve having a valve stem spring biased toward a valve seat, means for moving the valve stem upwardly as it is turned from a position where it is closed, comprising two coaxial elements carried by the valve stem laterally of its axis and one having a threaded connection with the valve stem and an annular flange, the other being threaded in the first and protruding beyond it, a cam element concentric with the valve stem engageable by the flange and having a steep portion to lift the stem off its seat, a low portion allowing the stem to approach the seat and a generally helical portion to move the valve stem to full open position for high fire, and a pilot fire control surface engageable by the protruding cam follower when the flange is opposite the low portion.

7. In a fuel feed control valve, a liquid chamber having an outlet valve seat, a cooperative rotatable and vertically reciprocable valve stem having two similarly facing spaced shoulders one larger than the other, a member fixed to the valve stem and positioned by one shoulder a predetermined distance from the other shoulder, a fixed cam concentric with the valve stem axis, the valve stem carried member having a vertical threaded hole at a distance from the valve stem axis intermediate the radii of the cam and larger shoulder respectively, a member threaded into said hole and having a flange engageable with the cam, and a spring acting on the valve stem to urge the stem toward the seat and the flange against the cam, the larger shoulder forming a stop limiting the adjustment of the threaded member and thereby providing a maximum possible valve opening when the flange is in engagement with the cam.

8. A valve mechanism for controlling flow of fuel to a burner, comprising a reservoir having a valve seat, a passage leading from the valve seat, a rotatable and vertically adjustable valve stem cooperable with the valve seat, spring means urging the valve stem toward closed position, two members having a common axis parallel with the valve stem axis, one being smaller than the other and protruding beyond it, each being adjustable along said common axis, a fixed stop at the radius of said common axis and engageable by the protruding member to control the pilot flow, and a generally helical cam surface at a greater radius and engageable by the larger diameter member to shift the valve stem from said pilot position to a full fire position, the cam surface opposite the stop having a portion which is out of engagement with the larger diameter member when the smaller diameter member is against the stop.

9. A mechanism as in claim 8, having at said greater radius a steep valve stem lifting surface engageable with said larger diameter member to lift the valve stem off its seat and carry the smaller member above the stop, and a valve stem lowering surface to lower the stem to bring the smaller member against the stop.

10. A mechanism as in claim 8, wherein the valve stem has a shoulder which limits the adjustment of the larger of said members toward high fire position.

11. A valve mechanism for controlling the flow of fuel past a valve seat to a burner, comprising a valve stem spring biased toward closed position, a cam surface concentric with the valve stem axis, a cooperable cam follower adjustably carried by the stem, the stem and cam surface being relatively rotatable, the cam surface containing a steep portion to lift the valve stem off the seat and provide a predetermined low valve opening, a reversely sloped portion to permit the valve stem to move toward closed position, and a generally helical portion to lift the valve stem to high fire position, and an adjustable stop carried by the rotatable element and engaging a surface on the fixed element for limiting the closing movement of the valve stem and providing a pilot adjustment when the follower is traversing said reversely sloped portion, said reversely sloped portion offering resistance to backward movement to indicate movement beyond the pilot adjustment.

12. A valve for controlling the flow of fuel to a burner, comprising a liquid fuel chamber having an outlet port, a reciprocable and rotatable valve stem cooperable with the outlet port to close the same or provide a variable opening, a fixed member through which the valve stem passes, a fixed cam concentric with the valve stem axis and facing in the direction of the valve stem axis, a member fixedly carried in the valve stem adjacent the cam and having a threaded hole at a less radius than the cam, a member threaded into the hole and having its end movable over the cam as the valve stem is turned, the cam having an arcuate portion of variable spacing from the valve seat and engageable with the threaded member, and a portion so close to the valve seat as to be beyond the movement of the threaded member when the valve stem is seated, a pressure spring about the valve stem, and means to transmit the spring pressure through the said threaded parts so that the threads are under spring pressure irrespective of whether the threaded member is in engagement with the follower or the valve stem is seated.

13. A valve as in claim 12, wherein said pressure transmitting means includes a second threaded member threaded into the first, and the fixed member through which the valve stem passes is provided with a surface against which the second threaded member bears during a portion of the rotation of the valve stem.

RALPH W. DE LANCEY.

REFERENCES CITED

The following references are of record in the file of this patent:

UNITED STATES PATENTS

| Number | Name | Date |
| --- | --- | --- |
| 2,155,761 | Johnson | Apr. 25, 1939 |
| 2,301,041 | Hann | Nov. 3, 1942 |
| 2,315,171 | Voorheis | Mar. 30, 1943 |